(12) United States Patent
de Cesare et al.

(10) Patent No.: US 7,302,595 B2
(45) Date of Patent: *Nov. 27, 2007

(54) METHOD AND APPARATUS FOR DYNAMIC POWER MANAGEMENT IN A PROCESSOR SYSTEM

(75) Inventors: Josh de Cesare, Campbell, CA (US); Michael Culbert, San Jose, CA (US); Keith Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/497,467

(22) Filed: Jul. 31, 2006

(65) Prior Publication Data

US 2006/0265616 A1    Nov. 23, 2006

Related U.S. Application Data

(63) Continuation of application No. 10/434,515, filed on May 7, 2003, now Pat. No. 7,240,223.

(51) Int. Cl.
*G06F 1/00* (2006.01)
(52) U.S. Cl. .................................. 713/300; 713/323
(58) Field of Classification Search ................ 713/300, 713/323
See application file for complete search history.

(56) References Cited

U.S. PATENT DOCUMENTS

| | | | | |
|---|---|---|---|---|
| 5,287,292 A | * | 2/1994 | Kenny et al. ............... | 702/132 |
| 5,339,445 A | * | 8/1994 | Gasztonyi ................... | 713/324 |
| 5,422,806 A | * | 6/1995 | Chen et al. .................. | 700/29 |
| 5,481,733 A | * | 1/1996 | Douglis et al. ............. | 713/324 |
| 5,812,860 A | * | 9/1998 | Horden et al. .............. | 713/322 |
| 5,954,820 A | * | 9/1999 | Hetzler ....................... | 713/323 |
| 6,198,245 B1 | * | 3/2001 | Du et al. ..................... | 318/471 |
| 6,442,699 B1 | * | 8/2002 | Nakajima .................... | 713/320 |
| 6,795,927 B1 | * | 9/2004 | Altmejd et al. ............. | 713/300 |
| 6,845,456 B1 | * | 1/2005 | Menezes et al. ............ | 713/320 |
| 6,859,882 B2 | * | 2/2005 | Fung .......................... | 713/300 |
| 6,996,441 B1 | * | 2/2006 | Tobias ........................ | 700/44 |

* cited by examiner

*Primary Examiner*—Thomas Lee
*Assistant Examiner*—Ji H Bae
(74) *Attorney, Agent, or Firm*—Blakely, Sokoloff, Taylor & Zafman LLP

(57) ABSTRACT

A dynamic power management system includes an operating system (OS) that causes a processor to operate in one of multiple run states that have different performance and/or power dissipation levels. The OS selects the run state in response to processor information (e.g., processor load) being monitored by the OS. The OS can predict future states of the processor information based on sampled processor information. The OS can take an average of the predicted and actual samples for comparison with a threshold to select a run state. The OS can track the number of consecutive saturated samples that occur during a selected window of samples. The OS can predict future processor information samples based on the number of consecutive saturated samples.

49 Claims, 6 Drawing Sheets

Fig. 5A

| SAMPLE HISTORY | | | | | | | | PREDICTED NUMBER OF SATURATED SAMPLES | AVG. |
|---|---|---|---|---|---|---|---|---|---|
| $S_{n-7}$ | $S_{n-6}$ | $S_{n-5}$ | $S_{n-4}$ | $S_{n-3}$ | $S_{n-2}$ | $S_{n-1}$ | $S_n$ | 4 | 95.6% |
| 99% | 83% | 80% | 90% | 96% | 100% | 100% | 100% | | |

4 MAX LOAD SAMPLES → HIGH PERFORM. STATE

Fig. 5B

| SAMPLE HISTORY | | | | | | | | PREDICTED NUMBER OF SATURATED SAMPLES | AVG. |
|---|---|---|---|---|---|---|---|---|---|
| $S_{n-6}$ | $S_{n-5}$ | $S_{n-4}$ | $S_{n-3}$ | $S_{n-2}$ | $S_{n-1}$ | $S_n$ | $S_{n+1}$ | 2 | 92.9% |
| 83% | 80% | 90% | 96% | 100% | 100% | 100% | 80% | | |

REDUCE PREDICTED NUMBER OF MAX LOAD SAMPLES BY 1/2 → POWER SAVE STATE

Fig. 5C

| SAMPLE HISTORY | | | | | | | | PREDICTED NUMBER OF SATURATED SAMPLES | AVG. |
|---|---|---|---|---|---|---|---|---|---|
| $S_{m-7}$ | $S_{m-6}$ | $S_{m-5}$ | $S_{m-4}$ | $S_{m-3}$ | $S_{m-2}$ | $S_{m-1}$ | $S_m$ | | |
| 75% | 100% | 98% | 100% | 100% | 100% | 100% | 75% | 3 | 95.3% |

→ REMAINS AT HIGH PERF. STATE

METHOD AND APPARATUS FOR DYNAMIC POWER MANAGEMENT IN A PROCESSOR SYSTEM

This application is a Continuation of U.S. patent application Ser. No. 10/434,515, filed on May 7, 2003 now U.S. Pat. No. 7,240,223.

FIELD OF THE INVENTION

The field of invention relates generally to processor systems and, more specifically but not exclusively relates to power management for processor systems.

BACKGROUND INFORMATION

In designing processor systems such as used in computing platforms, the computing platform (including the processor) is commonly designed to increase performance. However, especially in mobile applications, computing platforms are also designed to reduce power consumption. Typically, these design goals are in conflict.

One conventional solution to these goals is to provide a means for a user to switch the configuration of the computing platform between a high performance mode and a power conservation mode, as desired. For example, a computing platform may allow a user to select the desired mode via a hardware switch or via a menu and dialog box displayed by the computing platform. Such an approach requires user intervention.

SUMMARY OF THE INVENTION

In accordance with aspects of the present invention, a system includes a processor and a system memory to store an operating system that causes the processor to operate in one of multiple run states that have different performance and/or power dissipation levels. In one embodiment, the operating system selects the run state in response to processor information being monitored by the operating system. For example, the processor information can be the processor load history.

In another aspect of the present invention, the operating system predicts future states of the processor information. In one embodiment, the operating system predicts the future processor load based on the monitored processor load history. In a further refinement of this aspect, the operating system can take an average of the prediction and the actual processor information to be used in selecting a processor run state.

In yet another aspect of the present invention, in monitoring the processor information, the operating system tracks the number of consecutive saturated samples that occur during a selected window of samples. The operating system makes a prediction of future processor information samples based on the number of consecutive saturated samples. In further refinements, the operating system can vary the size of the window, the threshold for defining a saturated sample, the thresholds for transitioning between run states and/or the sample rate of the processor information.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 5A-5C are diagrams illustrating sample predictions and averages for various examples of sample histories.

DETAILED DESCRIPTION OF PREFERRED EMBODIMENTS

Figure 1:
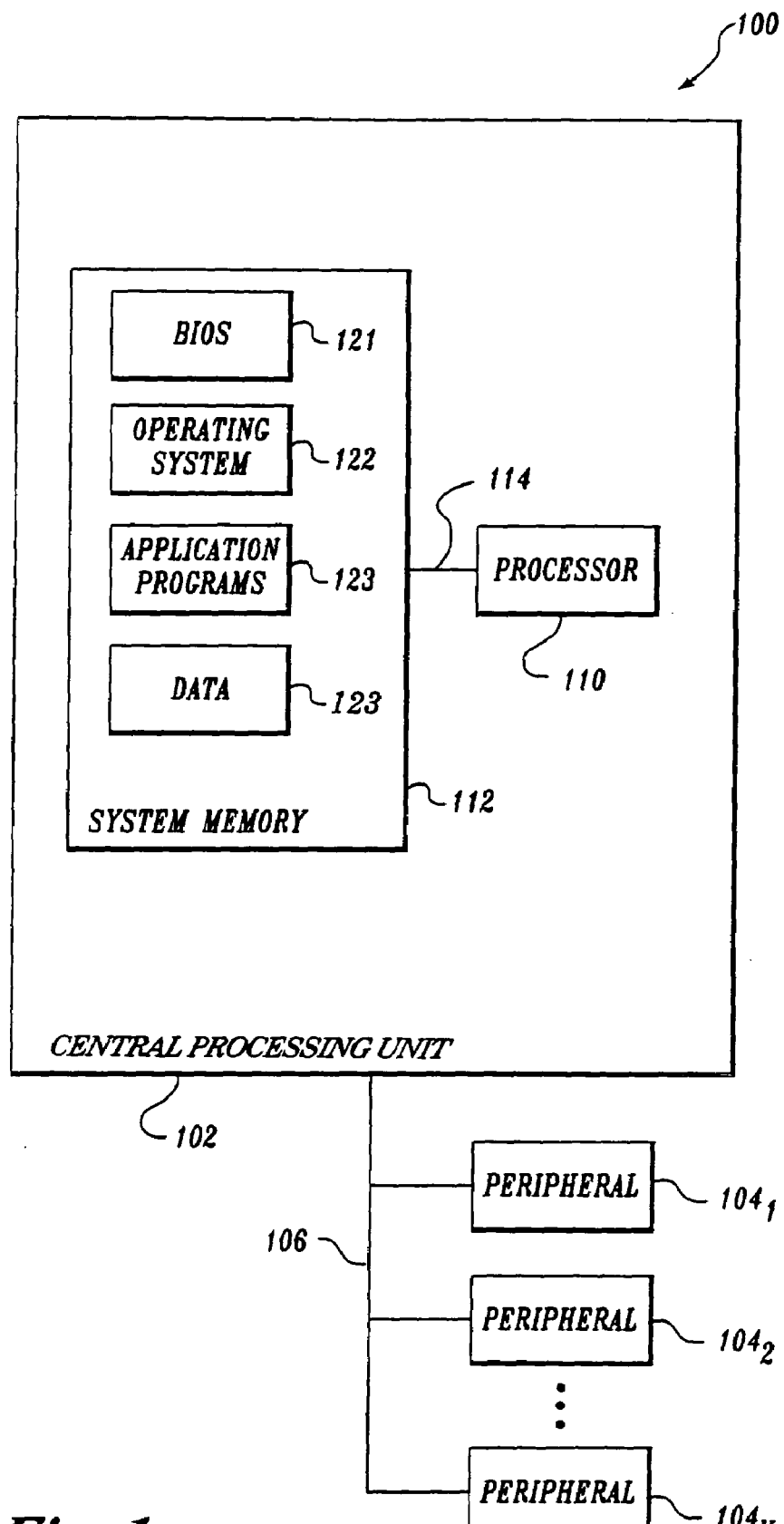
FIG. 1 is a simplified block diagram of an exemplary computer system, according to one embodiment of the present invention.

FIG. 1 illustrates an exemplary computing system 100 having dynamic power management according to one embodiment of the present invention. In this embodiment, computer system 100 includes a central processing unit 102 and peripherals $104_1$-$104_X$. Central processing unit 102 is connected to peripherals $104_1$-$104_X$ via one or more buses 106. In some embodiments, central processing unit 102 may include a peripheral controller or "south bridge" (not shown) to communicate with peripherals $104_1$-$104_X$.

In this embodiment, central processing unit 102 includes a processor 110 and a system memory 112 (typically implemented in RAM and ROM). Processor 110 is connected to system memory 112 via one or more buses 114. In some embodiments, a memory controller (not shown) may be used to transfer information between processor 110 and system memory 112. In other embodiments, central processing unit 102 can include multiple processors.

System memory 112 is typically used to store a basic input output system (BIOS) 121, an operating system 122, one or more application programs 123 and data 123. Processor 110 can be any suitable processor device such as, for example, a general-purpose microprocessor (such as commercially available from several vendors), a microcontroller, a digital signal processor, etc. This list of processor devices is representative and not intended to be exhaustive.

In this embodiment, peripherals $104_1$-$104_X$ can include one or more monitors, memory drives (e.g., hard disk drives, floppy disk drives, CD-ROM drives, DVD drives, flash memory drives, etc.), printers, scanners, etc. This list of peripherals is representative and not intended to be exhaustive.

In accordance with embodiments of the present invention, operating system 122 is configured to provide dynamic power management by configuring processor 110 to operate in one of several run states, based on monitored processor information. This dynamic power management is described in more detail below.

Figure 2:
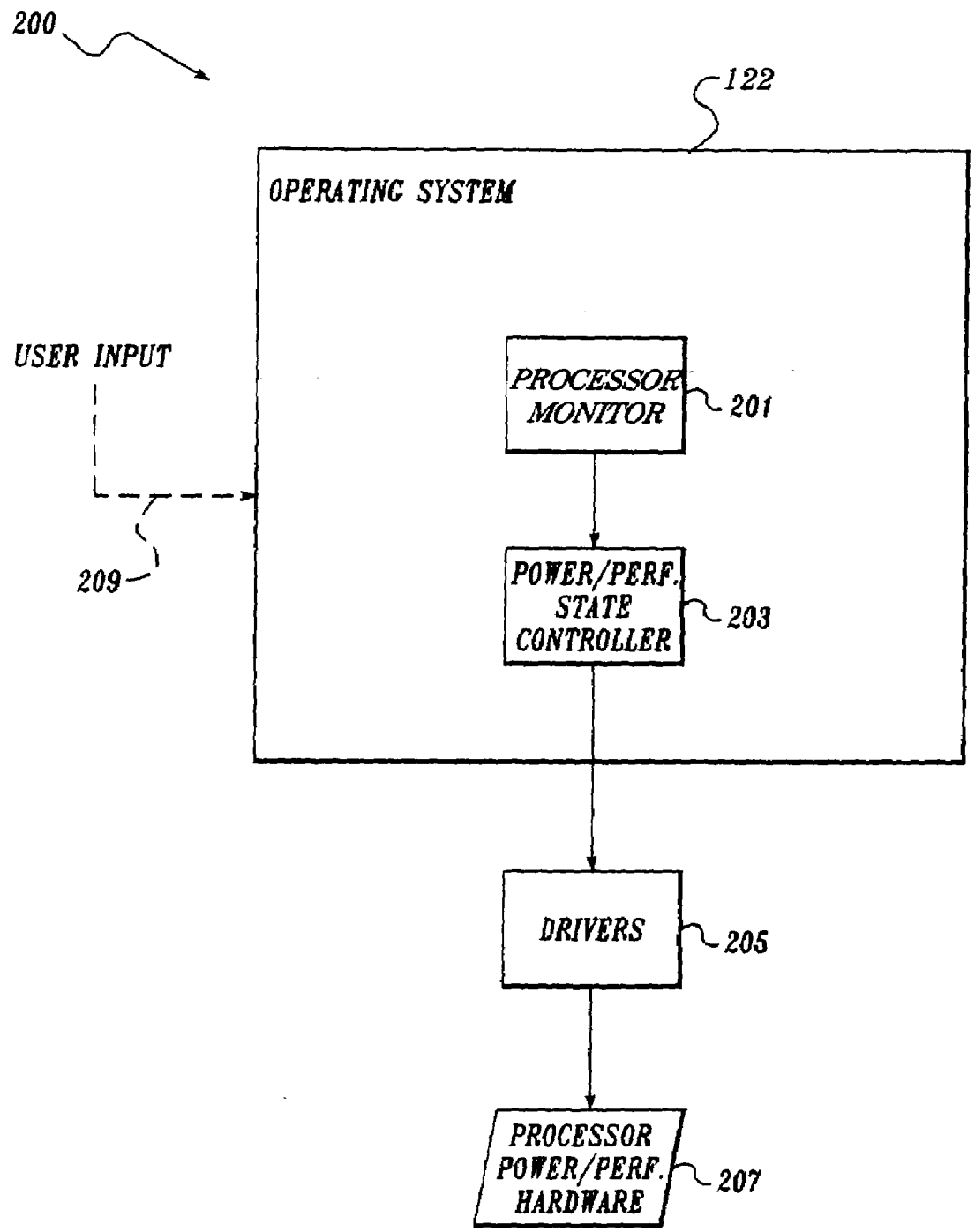
FIG. 2 is a block diagram illustrating a dynamic power management system according to one embodiment of the present invention.

FIG. 2 illustrates a dynamic power management system 200 implemented in central processing unit 102 (FIG. 1), according to one embodiment of the present invention. In this embodiment, dynamic power management system 200 includes operating system 122 (FIG. 1) having a processor monitor 201 and a power/performance state controller (also referred to herein as state controller) 203. Dynamic power management system 200 also includes one or more software drivers 205 and processor power/performance hardware 207. In other embodiments that have multiple processors, dynamic power management system 200 can "run" in a single processor to manage power/performance using all of the processors. Alternatively, the multiple processors can be divided into groups, with a processor of each group managing power/performance using the processors of its group.

In this embodiment, processor monitor 201 is a module that monitors one or more selected parameters while processor 110 (FIG. 1) operates. For example, processor monitor 201 can monitor the processor's workload. Such monitors are already implemented in most commercially available operating systems.

State controller 203, in this embodiment, is a module that determines a runs state for processor 110 (FIG. 1) based on information monitored by processor monitor 201. In one embodiment, state controller 203 is implemented as a finite state machine.

Drivers 205 are modules that provide control signals to processor hardware to change performance and/or power dissipation characteristics of processor 110 (FIG. 1). For example, in some embodiments drivers 205 are used to change the clock frequency or "core" voltage of processor 110 (FIG. 1) to alter performance/power dissipation characteristics of processor 110 (FIG. 1). In this embodiment, processor power/performance hardware 207 includes a clock generator, a core voltage regulator, or other circuitry that can vary the power/performance characteristics of processor 110 (FIG. 1).

The elements of dynamic power management system 200 are interconnected as follows. Processor monitor 201 of operating system 122 is coupled to communicate with state controller 203. State controller 203 is coupled to communicate with drivers 205, which are in turn coupled to communicate with processor power/performance hardware 207.

In addition, in one embodiment, operating system 122 has means to allow a user to provide input to dynamic power management system 200, as indicated by dashed arrow 209. For example, operating system 122 may cause a menu and/or dialog box to be displayed that allows a user to provide the input. As will be described in more detail below, some embodiments of dynamic power management system 200 have various user configurable parameters (e.g., thresholds, history sizes, etc.).

Figure 3:
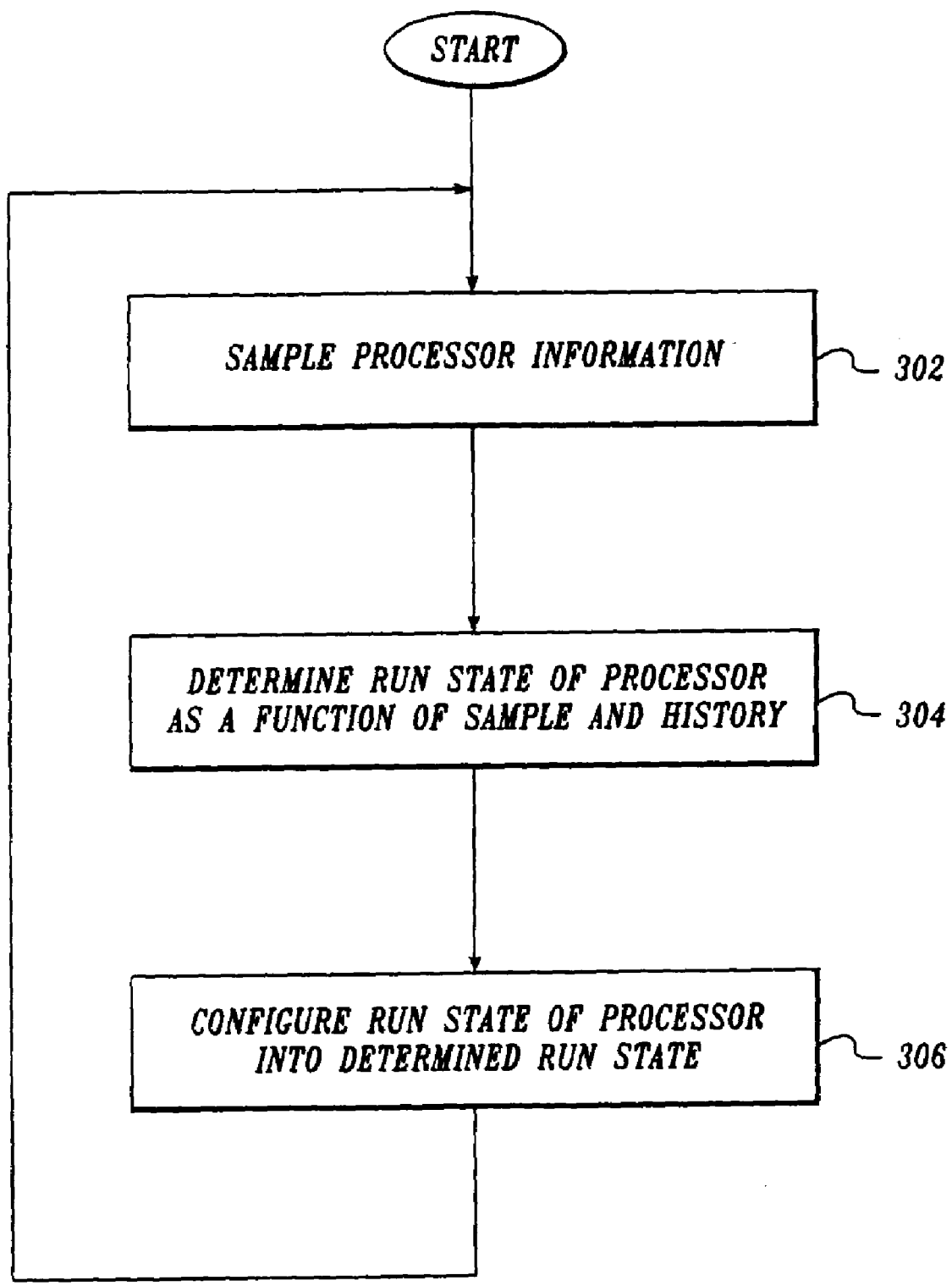
FIG. 3 is a flow diagram illustrating an operational flow of the system of FIG. 2, according to one embodiment of the present invention.

FIG. 3 illustrates an operational flow of dynamic power management system 200 (FIG. 2), according to one embodiment of the present invention. Referring to FIGS. 2 and 3, dynamic power management system 200 operates as follows.

In a block 302, processor information is sampled. In this embodiment, processor monitor 201 monitors one or more parameters of the operation of processor 110 (FIG. 1). In one particular embodiment, processor monitor 201 monitors the workload of processor 110 (FIG. 1), although different parameters can be monitored in other embodiments. For example, scheduler information (e.g., number of run-able threads) or per-thread statistics (e.g., priority, real-time requirements, % utilization of scheduling quanta) can be monitored. In a further refinement, the rate at which processor monitor 201 samples the processor information can be user configurable. In one embodiment, the most recent N samples of processor information are stored in a sample history. In some embodiments, N can be user configurable.

In a block 304, the run state of processor 110 (FIG. 1) is determined as a function of the sample history. In one embodiment, state controller 203 selects one of two or more possible run states in which processor 110 (FIG. 1) can operate. For example, in one embodiment, the multiple run states have combinations of different processor clock frequencies and/or core voltages. Thus, the processor's performance and power dissipation characteristics can be changed by changing the processor's run state. In one embodiment, state controller 203 predicts future processor information samples and then takes an average of the sample history and predicted samples. State controller 203 uses this average to determine what run state to select. For example, the range of averages may be divided into sub-ranges that correspond to particular run states, with state controller 203 determining which sub-range the average falls into. State controller 203 would then cause processor 110 (FIG. 1) to operate in the run state corresponding to that sub-range. One embodiment of block 304 is described in more detail below in conjunction with FIG. 4.

In a block 306, the processor is configured to operate in the run state determined in block 304. In one embodiment, state controller 203 causes one or more of drivers 205 to control (if necessary) processor power/performance hardware 207 to change the processor clock frequency and/or core voltage to the levels corresponding to the determined run state.

Figure 4:
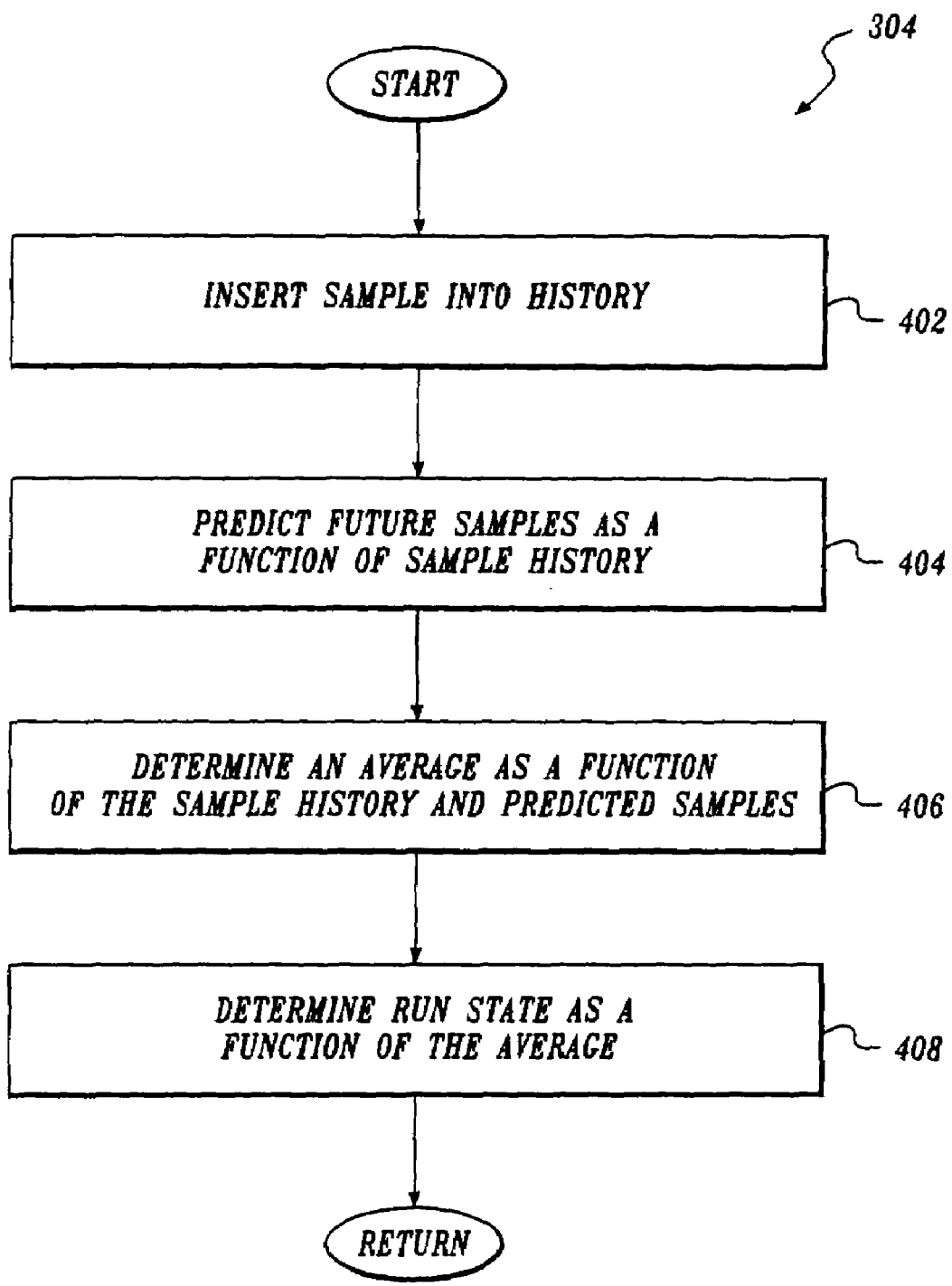
FIG. 4 is a flow diagram illustrating an operational flow of an operation depicted in FIG. 3, according to one embodiment of the present invention.

FIG. 4 illustrates an operational flow of block 304 (FIG. 3), according to one embodiment of the present invention. Referring to FIGS. 2 and 4, this embodiment of block 304 is performed as follows.

In a block 402, a sample of processor information is inserted in the sample history (not shown). In one embodiment, this sample history is a data structure stored in system memory 112 (FIG. 1) to store the N most recent samples. Process monitor 201, in this embodiment, inserts the most recent sample in the sample history. If the sample history is already full, the oldest sample is discarded and the most recent sample is stored in the opened place.

In a block 404, future sample(s) are predicted based on the sample history. In this embodiment, state controller 203 determines a prediction of future samples. In one embodiment, the prediction is based on the number of the most recent samples that are consecutively greater than a selected threshold (also referred to herein as "saturated samples"). In that embodiment, the number of the most recent consecutive saturated samples is then multiplied by a preselected factor. This product (e.g., rounded to non-negative integer P) serves as a prediction of the number of saturated samples to be received in the future. In other embodiments, different algorithms can be used to predict future samples (and need not be saturated samples).

In a block 406, an average is determined using the sample history and the predicted samples from block 404. In one embodiment, state controller 203 determines the mean of the N (can be less than N if the sample history is not full) samples stored in the sample history summed with the P predicted saturated samples. In one embodiment, the P saturated samples (if P is greater than zero) are assumed to have the maximum value that a sample of the processor information can have. For example, if the processor information is workload, then in one embodiment the P saturated samples would each have a value of 100% (i.e., the processor is working at 100% capacity). In other embodiments, the value of each saturated sample can be some other preselected value and the average can be calculated in other ways. In this sense, the average can be a value calculated using the sample history and predicted samples, which can be mapped into one of the possible run states of processor 110 (FIG. 1).

In a block 408, the run state is determined as a function of the average determined in block 406. In one embodiment, state controller 203 selects a run state from the processor's multiple possible run states. For example, the range of averages may be divided into non-overlapping but adjacent sub-ranges, each sub-range corresponding to a unique run state of the possible run states. In this embodiment, state controller 203 determines which sub-range contains the average, which in effect determines the run state. In other embodiments, the ranges may overlap so that hysteresis can be introduced in transitioning between run states.

FIGS. 5A-5C illustrate examples of how dynamic power management system 200 (FIG. 2) process different series of samples, according to one embodiment of the present invention. In this embodiment, the processor information is the processor workload and the samples are workload percentages.

In FIG. 5A, processor monitor 201 (FIG. 2) stores the eight most recent samples (i.e., N=8) in the sample history (not shown). In this embodiment, the number of predicted saturated samples is equal to the number of most recent accumulated saturated samples (i.e., the multiplying factor is 1) when the most recent sample is saturated. However, if the most recent sample is not saturated, the number of predicted saturated samples is equal to half the number of most recent accumulated saturated samples. In addition, the threshold for determining whether a sample is saturated is 95% (i.e., samples over 95% are considered saturated). Further, the number of run states in this embodiment is two (one being the high performance state and the other being the power saving state). The threshold between the two states is also 95% (i.e., an average greater than 95% corresponds to the high performance state) in this embodiment. In addition, in this embodiment, the value of each predicted saturated sample is set to 100%. Still further, the average is calculated as the mean of the entire sample history and predicted samples.

In this example, the most recent sample (i.e., sample $S_n$) is 100%. Consequently, sample $S_n$ is saturated. According to the prediction algorithm of this embodiment, the number of predicted saturated samples is the same as the number of the most recent consecutive saturated samples. In this case, the four most recent samples were saturated; thus, P is equal to four. The mean of the eight samples of the sample history (i.e., samples $S_{n-7}$, $S_{n-6}$, ..., $S_n$) and the four predicted saturated samples is 95.6%. Therefore, dynamic power management system 200 (FIG. 2) causes processor 110 (FIG. 1) to enter the high performance run state.

Continuing this example in FIG. 5B, the next sample (i.e., sample $S_{n+1}$) is 80%. Thus, sample $S_{n+1}$ is not saturated. As a result, the prediction algorithm requires that the number of predicted saturated samples be halved. Thus, in this example, P is reduced to two. The mean of the eight samples of the sample history (i.e., samples $S_{n-6}$, $S_{n-5}$, ..., $S_n$, $S_{n+1}$) and the two predicted saturated samples is 92.9%. Accordingly, dynamic power management system 200 (FIG. 2) causes processor 110 (FIG. 1) to enter the power saving run state.

This exemplary embodiment shows how dynamic power management system 200 (FIG. 2) can quickly respond to load changes. When the workload is relatively small, the processor can be operated in a low performance/power saving run state so that the computing platform will dissipate less power without causing the user to perceive the lower processor performance. This perception is possible because with a relatively low workload, the work is still performed relatively quickly at the lower performance run state. In this way, power dissipation is reduced without perceptibly affecting the user's experience. In this embodiment, the algorithm is designed with a goal to maximize the amount of time that the processor spends in the power saving run state without causing the user to perceive a reduction in processor performance. In other embodiments, can be used to achieve different power/performance goals.

FIG. 5C illustrates another sequence of eight samples stored in the sample history (i.e., samples $S_{m-7}$, $S_{m-6}$, ..., $S_m$, with $S_m$ being the most recent). In this example, six consecutive saturated samples were stored in the sample history, followed by the most recent sample that was not saturated (i.e., sample $S_m$ at 75%). As a result, after sample Sm was received, P is three in this example. The average of the sample history and three predicted saturated samples is about 95.3%.

In the previous cycle (i.e., when sample $S_{m-1}$ was received), P would have been equal to six, causing the average of the sample history and the six predicted saturated samples to be well above the 95% threshold for the high performance run state. Accordingly, dynamic power management system 200 (FIG. 2) causes processor 110 (FIG. 1) to remain in the high performance run state. This example illustrates how a single non-saturated sample will not necessarily cause the processor to enter the low power run state after receiving several consecutive saturated samples.

Embodiments of method and apparatus for dynamic power management are described herein. In the above description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computing system, comprising:
   a processor; and
   a system memory to store an operating system, the operating system to cause the processor to operate in a state selected from a plurality of states as a function of a sample history that includes one or more samples of processor information, each state of the plurality of states having a different performance level, and to predict future states of the processor information, wherein the operating system is to predict one or more future samples of processor information, and wherein the future samples are predicted as a function of saturated samples.

2. The system of claim 1 wherein the processor information comprises processor load information.

3. The system of claim 1 wherein a rate at which processor information is sampled is adjustable.

4. The system of claim 1 wherein each state has a different combination of processor clock frequency and processor voltage.

5. The system of claim 1 wherein a threshold value defining a transition between states is adjustable.

6. The system of claim 1 wherein the operating system is to determine an average of stored samples of processor information and predicted samples of processor information.

7. The system of claim 1 wherein future samples are predicted as a function of consecutive saturated samples.

8. The system of claim 1 wherein a threshold value of a sample defining a transition between a saturated sample and a non saturated sample is adjustable.

9. The system of claim 1 wherein future samples are predicted as a number of future saturated samples.

10. The system of claim 9 wherein when a most recent sample is a saturated sample, the number of future saturated samples is equal to a number of consecutive saturated samples, the consecutive samples including the most recent sample.

11. The system of claim 9 wherein when a most recent sample is not a saturated sample, the number of future saturated samples is about half of a number of consecutive saturated samples, the consecutive sample being received sequentially previous to the most recent sample.

12. A method performed by an operating system of a computing platform, the method comprising:
   receiving samples of processor information related to a processor's operation;
   causing the operating system to configure the processor to operate in a state selected from a plurality of states as a function of a sample history that includes one or more samples of the processor information, each state of the plurality of states having a different performance level, and to predict future states of the processor information; and
   predicting one or more future samples of processor information, wherein the future samples are predicted as a function of saturated samples.

13. The method of claim 12 wherein the processor information comprises processor load information.

14. The method of claim 12 wherein a rate at which processor information is sampled is adjustable.

15. The method of claim 12 wherein each state has a different combination of processor clock frequency and processor voltage.

16. The method of claim 12 wherein a threshold value defining a transition between states is adjustable.

17. The method of claim 12 further comprising determining an average of stored samples of processor information and predicted samples of processor information.

18. The method of claim 12 wherein a threshold value defining a transition between a saturated sample and a non saturated sample is adjustable.

19. The method of claim 12 wherein future samples are predicted as a function of consecutive saturated samples.

20. The method of claim 12 wherein future samples are predicted as a number of future saturated samples.

21. The method of claim 20 wherein when a most recent sample is a saturated sample, the number of future saturated samples is equal to a number of consecutive saturated samples, the consecutive samples including the most recent sample.

22. The method of claim 20 wherein when a most recent sample is not a saturated sample, the number of future saturated samples is about half of a number of consecutive saturated samples, the consecutive sample being received sequentially previous to the most recent sample.

23. A data processing system comprising:
   means for receiving samples of processor information related to a processor's operation;
   means for configuring the processor to operate in a state selected from a plurality of states as a function of a sample history that includes tracking a number of saturated samples of the processor information, each state of the plurality of states having a different performance level; means for predicting future states of the processor information; and
   means for predicting one or more future samples of processor information, wherein the future samples are predicted as a function of saturated samples.

24. The data processing system of claim 23 wherein the processor information comprises processor load information.

25. The data processing system of claim 23 wherein a rate at which processor information is sampled is adjustable.

26. The data processing system of claim 23 wherein each state has a different combination of processor clock frequency and processor voltage.

27. The data processing system of claim 23 wherein a threshold value defining a transition between states is adjustable.

28. The data processing system of claim 23 further comprising means for determining an average of stored samples of processor information and predicted samples of processor information.

29. The data processing system of claim 23 wherein a threshold value defining a transition between a saturated sample and a non saturated sample is adjustable.

30. The data processing system of claim 23 wherein future samples are predicted as a function of consecutive saturated samples.

31. The data processing system of claim 23 wherein future samples are predicted as a number of future saturated samples.

32. The data processing system of claim 31 wherein when a most recent sample is a saturated sample, the number of future saturated samples is equal to a number of consecutive saturated samples, the consecutive samples including the most recent sample.

33. The data processing system of claim 31 wherein when a most recent sample is not a saturated sample, the number of future saturated samples is about half of a number of consecutive saturated samples, the consecutive sample being received sequentially previous to the most recent sample.

34. A machine readable medium having instructions that when executed cause an operating system to perform operations comprising:
   receiving samples of information related to a processor's operation;
   causing the operating system to configure the processor to operate in a state selected from a plurality of states as a function of a sample history that includes one or more samples of the information, each state of the plurality of states having a different performance level and to predict future states of the processor information; and
   predicting one or more future samples of processor information, wherein future samples are predicted as a function of saturated samples.

35. The machine readable medium of claim 34 wherein the processor information comprises processor load information.

36. The machine readable medium of claim 34 wherein a rate at which processor information is sampled is adjustable.

37. The machine readable medium of claim 34 wherein each state has a different combination of processor clock frequency and processor voltage.

38. The machine readable medium of claim 34 wherein a threshold value defining a transition between states is adjustable.

39. The machine readable medium of claim 34 further comprising instructions that when executed cause the operating system to perform an operation comprising:
   determining an average of stored samples of processor information and predicted samples of processor information.

40. The machine readable medium of claim 34 wherein a threshold value defining a transition between a saturated sample and a non saturated sample is adjustable.

41. The machine readable medium of claim 34 wherein future samples are predicted as a function of consecutive saturated samples.

42. The machine readable medium of claim 34 wherein future samples are predicted as a number of future saturated samples.

43. The machine readable medium of claim 42 wherein when a most recent sample is a saturated sample, the number of future saturated samples is equal to a number of consecutive saturated samples, the consecutive samples including the most recent sample.

44. The machine readable medium of claim 42 wherein when a most recent sample is not a saturated sample, the number of future saturated samples is about half of a number of consecutive saturated samples, the consecutive sample being received sequentially previous to the most recent sample.

45. A machine readable medium having instructions that when executed cause a data processing system to perform a method comprising:
   receiving samples of information related to the operation of the data processing system;
   configuring the data processing system to operate in a state selected from a plurality of states as a function of a sample history that includes samples of the information, wherein the sample history includes tracking of a number of samples of a first type, and wherein each state of the plurality of states has a different performance level;
   predicting future states of the data processing system; and
   predicting one or more future samples of processor information, wherein future samples are predicted as a function of saturated samples.

46. The machine readable medium of claim 45 wherein the information comprises processor load information and wherein each state has a different combination of clock frequency and voltage.

47. The machine readable medium of claim 45 wherein a threshold value defining a transition between states is adjustable.

48. The machine readable medium of claim 45 wherein the first type is a saturated sample.

49. The machine readable medium of claim 45 wherein the first type is an unsaturated sample.

* * * * *